Dec. 31, 1946. W. BERG Re 22,826

UNITARY FOLDABLE MUSIC STAND

Original Filed Sept. 23, 1944

INVENTOR.
WILLIE BERG

BY
H. C. Bierman
ATTORNEY

Reissued Dec. 31, 1946

Re. 22,826

UNITED STATES PATENT OFFICE 22,826

UNITARY FOLDABLE MUSIC STAND

Willie Berg, Chicago, Ill.

Original No. 2,383,287, dated August 21, 1945, Serial No. 555,558, September 23, 1944. Application for reissue November 9, 1945, Serial No. 627,599½

14 Claims. (Cl. 45—57)

The present invention is directed to a foldable music stand, more particularly to a stand adapted for such use which is made in a single unit and which is readily foldable.

It is highly desirable to provide stands for music or the like which are adapted to be packed into a small volume and carried from place to place. A considerable number of such devices have been made in the past and in a certain measure have been satisfactory for the purpose in that they could be collapsed and carried in a relatively small volume. However, such devices were quite complicated in their structure and they involved a great many metal parts pivoted together and also other parts which are adapted to be telescoped. Such a structure is quite expensive and considerable manipulation is necessary both when setting up the stand and when taking it apart. It has also been proposed to provide a music stand having a lesser number of parts but provided with groove-like elements which allow the several parts of the stand to be secured together through such elements. However, such a stand was quite cumbersome and consisted of a number of separate parts so that it was necessary to manipulate the several parts to place them in their proper positions.

The present invention is intended and adapted to overcome the difficulties and disadvantages inherent in prior devices of this kind, it being among the objects of the present invention to provide a simple structure of a stand adapted for holding music and the like, which may by a simple folding be reduced to a small volume and which may then be readily transported.

It is also among the objects of the present invention to provide a structure consisting of a number of simple parts permanently secured together in such a manner that the several parts are always in their proper position whether the stand is operated or folded.

It is still further among the objects of the present invention to provide a stand made up principally of sheets of relatively stiff material preferably non-metal, with a structure such that when folded, a thin package is provided.

In practicing the present invention there is provided a vertical flat piece resting on one of its edges, which constitutes the base. Similarly, a second vertical flat piece having one of its edges attached to the first piece by hinges, is adapted to rest on one of its edges, which constitutes a base co-operating with the piece. There is also provided a flat holder which is hinged to the top of the first piece and rests in a notch in the second piece. Means for locking all of the elements in operative position are provided.

In the accompanying drawing constituting a part hereof and in which like reference characters indicate like parts, Fig. 1 is a front elevational view of a device made in accordance with the present invention and shown in the open or operative position;

Figure 1:
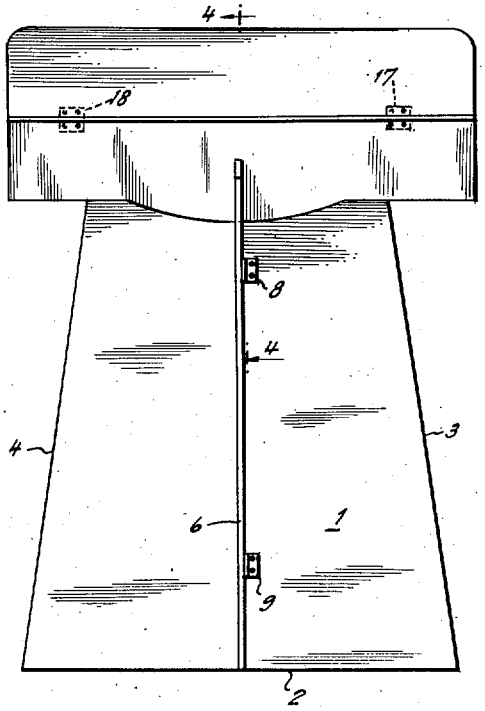
Figure 2:
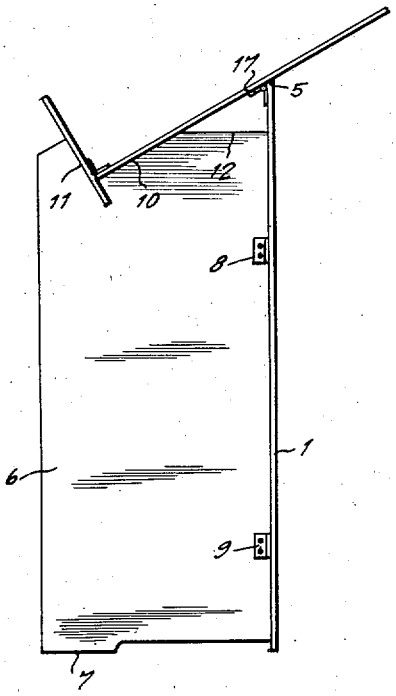
Fig. 2 is a side elevational view thereof.
Figure 3:
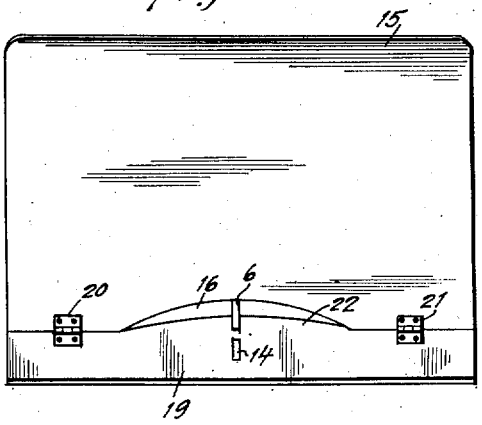
Fig. 3 is a top plan view thereof.

There is provided a vertical flat piece of material such as fiberboard or the like 1, resting on its bottom edge 2 which constitutes the base. The side edges 3 and 4 slope upwardly and inwardly so that the upper edge 5 is of lesser extent than base 2. A second piece 6 of flat material vertically placed is secured by hinges 8 and 9 to piece 1 along its vertical center line or axis. The lower edge 7 of piece 6 co-operates with base 2 to provide a firm foundation for the stand.

The upper edge of piece 6 is formed in a notch having a downwardly sloping upper edge 10 meeting a similar downwardly sloping edge 11, which meet approximately at right angles to provide the notch. The upper end 12 of piece 6 is parallel to base or bottom 7. A downwardly extending slot 13 is provided at the junction of edges 10 and 11. A tongue or projection 14 is integrally formed with the top of piece 6.

A holder 15 for music or the like also consists of a flat sheet of material having a cut out portion 16 arcuate in form at its lower edge. A pair of hinges 17 and 18 intermediate the top and bottom edges of holder 15 are secured to top 5 of piece 1. A foot board 19 is secured to holder 15 by hinges 20 and 21. Said foot board has an extending portion 22 arcuate in form below the hinges, the form of extension 22 being approximately complementary to portion 16. An opening 23 in foot board 19 provides means for insertion of locking tongue 14. A slot 24 in the lower edge of extension 22 is adapted to embrace piece 6.

Figure 4:
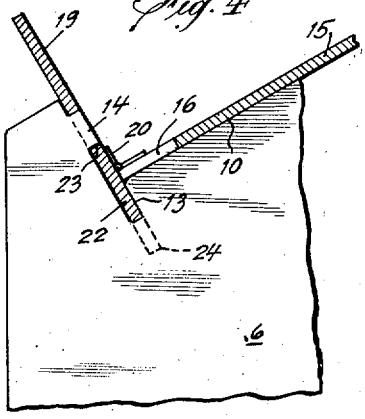
Fig. 4 is a vertical cross-sectional view somewhat enlarged taken along the line 4—4 of Fig. 1.

As shown in the drawing, the stand is in its operative position. When it is desired to fold the same into a compact package, foot board 19 is swung to the right as shown in Fig. 4 to disengage tongue 14 from opening 23, the movement being facilitated by slot 24. When the foot board is free from the tongue, it is raised upward carrying with it holder 15. The foot board may then be folded against the holder and piece 6 is moved about its hinges to lie flat against piece 1. Then the holder and foot board are caused to lie flat against pieces 1 and 6. In this position the stand may be readily carried from place to place under the arm of the indvidual. When it is desired to set the stand up, the reverse operations may be conducted. In either case, it is a matter of a few seconds to open or fold the stand.

Although I have described the invention setting forth a single embodiment thereof, the invention is not to be limited by the example as many variations in details of construction may be made within the spirit of the invention. For instance, the shapes and outlines of the various parts may be changed at will. The materials of construction may be any which are suitable for the purpose, but a very light fiber board is preferred because of convenience in carrying the same. The locking arrangement may be varied to a substantial degree in the shape of the locking elements, the form thereof, and the number and location. These and other changes in details may be made in the mechanical construction of the new stand within the scope of the invention, which is not to be limited except by the character of the claims appended hereto.

I claim:

1. A foldable stand comprising a vertical flat piece resting on its base, a similar second piece attached to said first piece by hinges and adapted to be held at right angles thereto and to be folded against the same, a flat holder hinged to the top of said first piece, a foot board hingedly attached to the lower edge of said holder, the top of said second piece being notched, said notch having an inclined face, said holder lying on said face to retain said holder in an inclined position, and a tongue and slot connection between said second piece and holder for locking said parts against relative movement.

2. A foldable stand comprising a vertical flat piece resting on its base, a similar second piece attached to said first piece by hinges at approximately the vertical centerline of said first piece, and adapted to be held at right angles thereto and to be folded against the same, a flat holder hinged to the top of said first piece, a foot board hingedly attached to the lower edge of said holder, the top of said second piece being notched, said notch having an inclined face, said holder lying on said face to retain said holder in an inclined position, and a tongue and slot connection between said second piece and holder for locking said parts against relative movement.

3. A foldable stand comprising a vertical flat piece resting on its base, a similar second piece attached to said first piece by hinges and adapted to be held at right angles thereto and to be folded against the same, a flat holder hinged to the top of said first piece, a foot board hingedly attached to the lower edge of said holder at points intermediate the upper and lower edges thereof, the top of said second piece being notched, said notch having an inclined face, said holder lying on said face to retain said holder in an inclined position, and a tongue and slot connection between said second piece and holder for locking said parts against relative movement.

4. A foldable stand comprising a vertical flat piece resting on its base, a similar second piece attached to said first piece by hinges and adapted to be held at right angles thereto and to be folded against the same, a flat holder hinged to the top of said first piece, a foot board hinged to the lower edge of said holder, the top of said second piece being notched, said notch having an inclined face, said holder lying on said face to retain said holder in an inclined position, and a tongue and slot connection between said second piece and holder for locking said parts against relative movement.

5. A foldable stand comprising a vertical flat piece resting on its base, a similar second piece attached to said first piece by hinges and adapted to be held at right angles thereto and to be folded against the same, a flat holder hinged to the top of said first piece, a foot board hinged to the lower edge of said holder, a depending portion centrally of said board in contact with said second piece, the top of said second piece being notched, said notch having an inclined face, said holder lying on said face to retain said holder in an inclined position, and a tongue and slot connection between said second piece and holder for locking said parts against relative movement.

6. A foldable stand comprising a vertical flat piece resting on its base, a similar second piece attached to said first piece by hinges and adapted to be held at right angles thereto and to be folded against the same, a flat holder hinged to the top of said first piece, a foot board hingedly attached to the lower edge of said holder, the top of said second piece being notched, said notch having an inclined face, said holder lying on said face to retain said holder in an inclined position, and a tongue and slot connection between said second piece and holder for locking said parts against relative movement, including a tongue and slot on said holder and second piece adapted to lock the same together when said stand is in operative position.

7. A foldable stand comprising a vertical flat piece resting on its base, a similar second piece attached to said first piece by hinges and adapted to be held at right angles thereto and to be folded against the same, a flat holder hinged to the top of said first piece, a foot board hinged to the lower edge of said holder, the top of said second piece being notched and adapted to retain said holder in an inclined position, and a tongue and slot connection between said second piece and holder for locking the pieces, holder and foot board against relative movement, including a tongue on said notch and a slot in said foot board adapted to lock the same together when said stand is in operative position.

8. A foldable stand comprising a vertical flat piece resting on its base, a similar second piece attached to said first piece by hinges and adapted to be held at right angles thereto and to be folded against the same, a flat holder hinged to the top of said first piece, a foot board hinged to the lower edge of said holder, a depending portion centrally of said board in contact with said second piece, the top of said second piece being notched and adapted to retain said holder in an inclined position, and a tongue and slot connection between said second piece and holder for locking the pieces, holder and foot board against relative movement, including a tongue on said notch and a slot in said foot board adapted to lock the same together when said stand is in operative position, and a slit in the end of said portion adapted to embrace said second piece.

9. A foldable stand comprising a vertical flat piece resting on its base, a similar second piece attached to said first piece by hinges and adapted to be held at right angles thereto and to be folded against the same, a flat holder hinged to the top of said first piece, a foot board hinged to the lower edge of said holder, a depending portion centrally of said board in contact with said second piece, a cut-out portion along the lower edge of said holder corresponding to said depending portion, the top of said second piece being notched and adapted to retain said holder in an inclined position, and a tongue and slot connection between said second piece and holder for locking said parts against relative movement.

10. A foldable stand comprising a substantially vertical rear piece resting on its lower edge, a second substantially vertical front piece also resting on its lower edge and hinged to said first piece to swing about a vertical axis and having its top inclined forwardly, said second piece being adapted to be held at an angle to said first piece so that the front edge of said second piece is positioned forwardly of the central portion of said first piece and to be folded against the same, a forwardly inclined holder hinged to the upper part of said first piece and adapted to be swung downwardly to rest on the top of said second piece, and means at the central part of the lower edge of said holder for locking said pieces and holder together to retain said holder in operative position.

11. A foldable stand comprising a substantially vertical rear piece resting on its lower edge, a second substantially vertical front piece also resting on its lower edge and hinged to said first piece to swing about a vertical axis and having its top inclined forwardly, said second piece being adapted to be held at an angle to said first piece so that the front edge of said second piece is positioned forwardly of the central portion of said first piece and to be folded against the same, a forwardly inclined holder hinged to the top of said first piece and adapted to be swung downwardly to rest on the top of said second piece, a footboard hinged to the lower edge of said holder, and means at the central part of the lower edge of said footboard for locking said pieces and holder together to retain said holder in operative position.

12. A foldable stand comprising a substantially vertical rear piece resting on its lower edge, a second substantially vertical front piece also resting on its lower edge and hinged to said first piece to swing about a vertical axis and having its top inclined forwardly, said second piece being adapted to be held at an angle to said first piece so that the front edge of said second piece is positioned forwardly of the central portion of said first piece and to be folded against the same, a forwardly inclined holder hinged to the upper part of said first piece and adapted to be swung downwardly to rest on the top of said second piece, a footboard secured to the lower edge of said holder, and hinged thereto along a substantially horizontal axis, the front of the upper edge of said second piece being inclined upwardly and forwardly and said footboard contacting with the same, and means at the central part of the lower edge of said footboard for locking said pieces and holder together to retain said holder in operative position.

13. A foldable stand comprising a substantially vertical rear piece resting on its lower edge, a second substantially vertical front piece also resting on its lower edge and hinged to said first piece to swing about a vertical axis and having its top inclined forwardly, said second piece being adapted to be held at an angle to said first piece so that the front edge of said second piece is positioned forwardly of the central portion of said first piece and to be folded against the same, a forwardly inclined holder hinged to the upper part of said first piece and adapted to be swung downwardly to rest on the top of said second piece, said second piece having an inclined upper edge on which said holder rests, and means at the central part of the lower edge of said holder for locking said pieces and holder together to retain said holder in operative position.

14. A foldable stand comprising a substantially vertical rear piece resting on its lower edge, a second substantially vertical front piece also resting on its lower edge and hinged to said first piece to swing about a vertical axis and having its top inclined forwardly, said second piece being adapted to be held at an angle to said first piece so that the front edge of said second piece is positioned forwardly of the central portion of said first piece and to be folded against the same, a forwardly inclined holder hinged to the top of said first piece and adapted to be swung downwardly to rest on the top of said second piece, an extension on the lower edge of said holder, and means at the central part of the lower edge of said holder for locking said pieces and holder together to retain said holder in operative position, including a tongue and slot connection between said second piece and holder.

WILLIE BERG.